United States Patent
Rex et al.

(10) Patent No.: US 8,239,835 B2
(45) Date of Patent: Aug. 7, 2012

(54) AUTOMATED SOFTWARE TESTING FRAMEWORK USING INDEPENDENT TEST SCRIPTS

(75) Inventors: Bharath Anand Rex, Coimbatore (IN); Abhishek Shanker, Patna (IN); Phanindra Kumar Mandala, Ananthapur (IN); Amit Shenoy, Bangalore (IN)

(73) Assignee: Infosys Limited, Bangalore (IN)

( * ) Notice: Subject to any disclaimer, the term of this patent is extended or adjusted under 35 U.S.C. 154(b) by 1492 days.

(21) Appl. No.: 11/745,187

(22) Filed: May 7, 2007

(65) Prior Publication Data

US 2008/0282231 A1 Nov. 13, 2008

(51) Int. Cl.
*G06F 9/45* (2006.01)
(52) U.S. Cl. ....................................... 717/127
(58) Field of Classification Search ................... 717/127
See application file for complete search history.

(56) References Cited

U.S. PATENT DOCUMENTS

| | | | | |
|---|---|---|---|---|
| 5,390,325 | A * | 2/1995 | Miller | 714/38.14 |
| 5,490,249 | A * | 2/1996 | Miller | 714/38.14 |
| 7,299,382 | B2 * | 11/2007 | Jorapur | 714/38.14 |
| 7,694,181 | B2 * | 4/2010 | Noller et al. | 714/38.11 |
| 2007/0234293 | A1 * | 10/2007 | Noller et al. | 717/124 |

OTHER PUBLICATIONS

IBM, "One Company's Approach to Functional Test Automation with Rational Tools," <http://www-128.ibm.com/developerworks/rational/library/3790.html> 4 pages (accessed Mar. 21, 2007).

Mercury, "Functional Testing: Mercury Quicktest Professional," <http://www.mercury.com/us/website/pdf-viewer/?url=/us/pdf/products/datasheets/DS-0985-0306-qtp.pdf> 2 pages (accessed Feb. 28, 2007).

Hewlett-Packard, "Mercury QuickTest Professional," <http://www.mercury.com/us/products/quality-center/functional-testing/quicktest-professional/?jumpid=reg_R1002_USEN> 2 pages (accessed Feb. 28, 2007).

Mercury, "Testdirector for Quality Center," <http://www.mercury.com/us/website/pdf-viewer/?url=/us/pdf/products/datasheets/DS-1134-0906-testdirector.pdf > 2 pages (accessed Feb. 28, 2007).

Hewlett-Packard, "Mercury TestDirector," <http://www.mercury.com/us/products/quality-center/testdirector/?jumpid=reg_R1002_USEN> 1 page (accessed Feb. 28, 2007).

Email between Infosys and U.S. client of Infosys, "Automation Approach Sign Off," 2 pages (Feb. 23, 2006).

Infosys, "POC (Proof of Concept) for Test Automation," PowerPoint presentation to U.S. client of Infosys, 9 pages (Feb. 22, 2006).

* cited by examiner

*Primary Examiner* — John Chavis
(74) *Attorney, Agent, or Firm* — Klarquist Sparkman, LLP

(57) ABSTRACT

A software testing framework for testing independent scenarios of software applications can comprise independent test scripts, business rules repositories, and test data sources. Independent test scripts can be used to test screens of the software application. Business rules repositories can be stored separately from independent test scripts and from test data sources. A framework for testing end-to-end scenarios of software applications can comprise modules, business rules repositories, and test data sources. An end-to-end scenario can be tested by executing two or more independent test scripts. Independent scenarios can be tested using a framework by populating fields, determining expected and actual results, and comparing the expected and actual results. End-to-end scenarios can be tested by executing independent test scripts associated with independent scenarios of the end-to-end scenario. Software testing can be performed without using test cases.

23 Claims, 12 Drawing Sheets

LIFE INSURANCE – NEW CLAIM

Claimant: John Doe
Policy number: 12345

910

| | |
|---|---|
| Date of loss: | |
| Notification received: | |
| Cause of loss: | Accident ▽ |
| Country of loss: | United States ▽ |
| Adjustment: | |

SUBMIT

LIFE INSURANCE – CLAIM ASSESSMENT

Claimant: John Doe
Policy number: 12345

1010

Status: [ ▽ ]
Authorize
Defer
Decline

Reason: [ None ▽ ]

( SUBMIT )

| LIFE INSURANCE – CLAIM PAYMENT |

Claimant: John Doe
Policy number: 12345

1110

Liability amount: ☐

Interest amount: ☐

Expenses amount: ☐

Total payment: ☐

( SUBMIT )

SOFTWARE 1280 FOR TECHNOLOGY
DESCRIBED IN EXAMPLE(S)

AUTOMATED SOFTWARE TESTING FRAMEWORK USING INDEPENDENT TEST SCRIPTS

BACKGROUND

Software testing is becoming increasingly important. Owners, operators, and users of computer software expect and demand high standards of reliability. If a software system, such as a business software application, experiences a failure, data integrity can be affected (e.g., data can be lost or corrupted).

Typically, software testing involves the use of test cases directed at testing individual functions of a software application. For example, in order to test 10 functions related to a specific page of the software applications, 10 different test cases can be required. In order to test various combinations of the 10 functions, new test cases can be required.

Furthermore, test cases can incorporate business rules and navigation. A number of test cases can incorporate the same business rule and/or navigation. For example, a number of test cases can be developed to test a sequence of pages of a software application. Each of the test cases can test the same function, and thus the same business rule, on the first page of the sequence. After testing the function on the first page, each of the test cases can proceed to a different second page of the software application. However, because the number of test cases all include the same business rule to test the function on the first page, if the business rule needs to be modified or updated, then each of the number of test cases will need to be modified or updated.

While testing of software applications using test cases can be a relatively straightforward task where there are a small number of pages and/or functions to test, testing of complex software applications using test cases can be difficult. For example, if a business rule or function of the software application changes, a large number of test cases may need to be modified or updated. This can be a difficult, time consuming, and error-prone process. In addition, testing a large or complex software application can require many different test cases in order to test all the various business processes (e.g., business processes that span multiple pages of the software application).

Therefore, there exists ample opportunity for improvement in technologies related to testing software applications.

SUMMARY

A variety of technologies related to software testing of software applications can be applied. For example, the technologies can be applied to testing of software applications without using test cases.

For example, an automated software testing framework for testing independent scenarios of software applications can be provided. The framework can comprise independent test scripts corresponding to independent scenarios of a software application. The independent test scripts can be used to test screens of the software application. The framework can further comprise test data sources and business rules repositories containing business rules associated with the screens. Each business rule can be associated with a specific screen. The business rules repositories can be stored separately from the independent test scripts and from the test data sources.

A software testing framework for testing end-to-end scenarios of software applications (e.g., without using test cases) can be provided. The framework can comprise a plurality of modules (e.g., each comprising one or more independent test scripts) of a software application, a plurality of business rules repositories, and a plurality of test data sources. Each business rule repository of the plurality of business rules repositories can be associated with a different screen of the software application. The independent test scripts can use the test data to evaluate business rules and populate fields of the screens. End-to-end scenarios of the software application can be tested by executing (e.g., in a user-defined sequence) independent test scripts from at least two of the plurality of modules.

A method for testing an independent scenario of a software application using an automated testing framework can be provided. For example, the method can populate fields on a screen of the software application with test data, determine expected results based on evaluation of business rules, submit the screen and determine actual results, compare the expected and actual results, and, based on the comparison, output an indication of whether the software application is operating correctly.

A method for testing an end-to-end scenario of a software application using an automated software testing framework (e.g., without using test cases) can be provided. For example, the method can execute an independent test script for each of a plurality of independent scenarios of the software application. The execution can comprise navigating to screens, receiving test data, populating fields on the screens with test data, evaluating business rules to determine expected results, submitting the screens to determine actual results, comparing the expected and actual results, and indicating whether the software application is operating correctly.

Independent test scripts can perform various functions. For example, independent test scripts can populate fields on a screen with test data, determine expected results based on evaluation of business rules (e.g., using test data), submitting screens, determining actual results, comparing expected and actual results, and indicating (e.g., outputting) results of the comparison.

The foregoing and other features and advantages of the invention will become more apparent from the following detailed description, which proceeds with reference to the accompanying figures.

BRIEF DESCRIPTION OF THE DRAWINGS

FIG. 9 is a diagram showing an exemplary screen for creating a life insurance claim.

FIG. 10 is a diagram showing an exemplary screen for assessing a life insurance claim.

FIG. 11 is a diagram showing an exemplary screen for payment of a life insurance claim.

DETAILED DESCRIPTION OF EXEMPLARY EMBODIMENTS

Example 1

Exemplary Software Testing Framework

Figure 1:
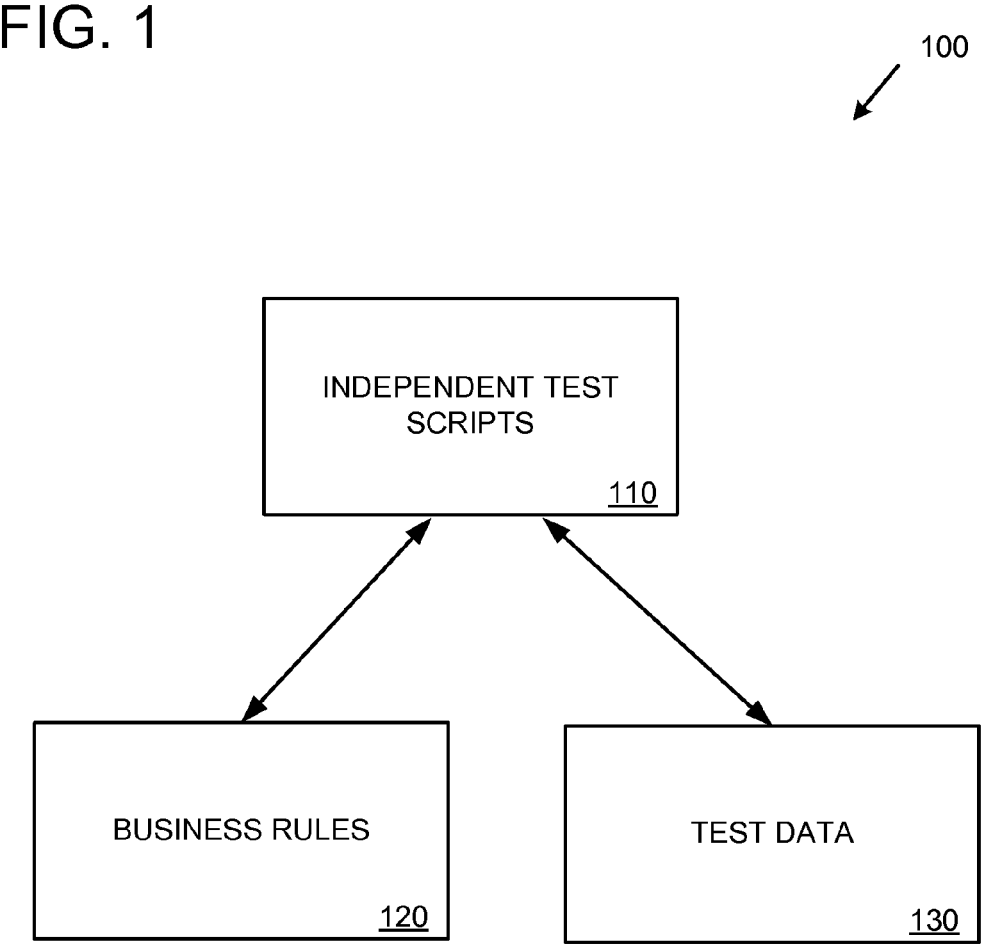
FIG. 1 is a diagram showing an exemplary software testing framework.

In any of the examples herein, a software testing framework can comprise components used to test software (e.g., software applications). For example, a software testing framework can comprise independent test scripts, business rules repositories, test data sources, modules, libraries, functions, log files, results files, and other types of components.

A software testing framework can be used to test software (e.g., software applications). For example, a software application can be a software application used to implement business processes of a business or organization. A software application can run on one or more computing devices (e.g., desktop computers, notebook computers, server computers, portable computing devices, and the like). A software application can be accessed locally (e.g., a software application running on a local server) or remotely (e.g., using a web browser to access a software application running on a remote server over the Internet). For example, a software application can be an insurance claims processing software application. The insurance claims processing software application can be running on one or more computers (e.g., one or more servers) of an insurance company. Accessing the insurance claims processing software application can be accomplished via one or more web pages (e.g., accessed via a web browser).

A software testing framework can be automated (e.g., via a computing device). For example, a software testing framework can be used to test independent scenarios (e.g., multiple independent scenarios) of a software applications automatically (e.g., without user intervention). Automated testing can be accomplished using independent test scripts. For example, a user can setup independent test scripts, test data sources, business rules repositories, etc., to test multiple independent test scripts (e.g., multiple independent test scripts run sequentially to form an end-to-end scenario). The user can then initiate the testing process. From there, the independent test scripts can run through the multiple independent scenarios automatically.

A software testing framework can be implemented at least in part by a computing device. For example, one or more components or functions of the software testing framework can be operated by (e.g., executed by or run on) a computing device. For example, a computing device can store components of a software testing framework (e.g., store independent test scripts, business rules, test data, end-to-end scenario definitions, etc.). A computing device can execute or run functions of a software testing framework (e.g., execute independent test scripts or end-to-end scenarios, compare results, output, display, or save results, etc.).

A software testing framework can be used to test software applications without using test cases. Test cases can be used to test individual business rules. For example, in order to test a screen of a business application containing 10 fields, 10 test cases can be required (one test case to test each of the 10 fields). In order to test a second screen of a software application containing 5 fields, 5 test cases can be required (one test case to test each of the 5 fields). In order to test various combinations of fields on these two screens using test cases, new test cases can be needed (e.g., 50 new test cases to test every combination of fields on the two screens).

Instead of using test cases, a software testing framework can test a software application using independent test scripts, business rules, and test data. For example, a business rules repository can contain all the business rules for a screen of the software application. An independent test script can test one or more screens of the application by evaluating the business rules for the screen (e.g., all the business rules for the screen). For example, the independent test script can populate fields on the screen (e.g., using retrieved test data), determine expected results based on the business rules, determine actual results based on submission of the screen, and compare the expected and actual results. The independent test script can save results of the comparison (e.g., whether the software application produced the correct actual results).

Example 2

Exemplary Module

In any of the examples herein, a module can be a related group of steps of a number of related business processes of a software application. A business process can represent a typical sequence of steps performed when using a software application. For example, a business process for an insurance claims processing software application can include the following sequence of steps (e.g., performed by a user of the software application): create a new life insurance claim, assess the life insurance claim, and make a payment decision regarding the life insurance claim. A related business process for the insurance claims processing software application can include the following sequence of steps: create a medical bills insurance claim, assess the medical bills claim, and make a payment decision regarding the medical bills claim. Because a number of business processes for processing an insurance claim begin by creating a new claim (e.g., using the same new claim screen), the various new claim steps can be grouped into one module (e.g., a new claim module).

For example, an insurance claims processing software application can include the following modules: create a new insurance claim, assessment of an insurance claim, and payment of an insurance claim.

Example 3

Exemplary Independent Scenario

In any of the examples herein, an independent scenario can be a module implemented for a specific situation (e.g., a sub-module). For example, a module for creating a new insurance claim can include three independent scenarios. The first independent scenario can be creating a new life insurance claim. The second independent scenario can be creating a new medical bills claim. The third independent scenario can be creating a new disability claim.

Independent scenarios can be tested independently. For example, a user can test an independent scenario of a software application using an independent test script. Multiple independent scenarios can also be tested together. For example, a user can test multiple independent scenarios of a software application using multiple independent test scripts (e.g., executed sequentially). Multiple independent scenarios can be tested together (e.g., sequentially) to form an end-to-end scenario.

Example 4

Exemplary Independent Test Script

In any of the examples herein, an independent test script can be a software testing script. An independent test script can be created using a computer language (e.g., Visual Basic, Visual Basic Script, JAVA™, C++, Perl, etc.) in order to write software testing instructions. One or more independent test scripts can be used to automate the software testing process.

An independent test script can comprise one or more script files (e.g., one or more Visual Basic script files). An independent test script can comprise one or more functions implemented using the computer language of the independent test script (e.g., functions to navigate between screens of a software application, functions to populate fields on screens, functions to evaluate business rules, functions to submit screens, functions to determine actual results upon submission of screens, functions to compare expected and actual results, functions to store, display, or output results, etc.).

Independent test scripts can be used to test one or more screens of a software application. An independent test script can be associated with (e.g., used to implement) an independent scenario (e.g., there can be a one-to-one correspondence between independent scenarios and independent test scripts).

Various vendors provide software testing programs. Typically, software testing instructions are developed for these software testing programs using scripts, which control the software testing program. For example, scripts, such as independent test scripts, can be developed for the software testing program QuickTest Professional™ provided by Mercury™.

Example 5

Exemplary End-to-End Scenario

In any of the examples herein, an end-to-end scenario can be a sequence of two or more independent scenarios. A sequence of two or more independent scenarios can correspond to a business process of a software application. For example, an end-to-end scenario can comprise the following sequence of independent scenarios: create new life insurance claim, approve life insurance claim, pay life insurance claim.

An end-to-end scenario can be tested using independent test scripts associated with the independent scenarios of the end-to-end scenario.

An end-to-end scenario can comprise two or more independent scenarios, each selected from a different module of the software application.

Example 6

Exemplary Batch of End-to-End Scenarios

In any of the examples herein, a batch can comprise one or more end-to-end scenarios. For example, a batch, comprising one or more end-to-end scenarios, can be created by a user testing one or more software applications.

After the batch has been created, the batch can be executed. For example, each end-to-end scenario of the batch can be executed (e.g., one after another, in sequential order) without user intervention.

For example, a user can create a batch of one or more end-to-end scenarios to test a software application. The user can set the batch to execute automatically (e.g., overnight). For example, the software testing framework can begin the batch (e.g., start executing at a user-designated time) and run through each end-to-end scenario in order. Once the batch has finished, the user can review the results (e.g., the next morning).

Example 7

Exemplary Business Rules

In any of the examples herein, a business rule can be a rule describing the operation of a software application. A business rule can be used to determine whether a software application is operating correctly or incorrectly.

Business rules can be associated with fields on screens of a software application. A field on a screen of a software application can be associated with multiple business rules. For example, one business rule of a specific field can indicate whether the field should be visible (e.g., based on specific test data). Another business rule for the specific field can indicate whether the software application should produce an error (e.g., based on specific test data). The specific error message can also be indicated by the business rule.

Evaluation of a business rule can indicate whether a field of a screen of an application should be visible (e.g., an expected result). For example, a business rule for indicating whether a field of a screen should be visible can be "claim_type=life_insurance." When evaluating the business rule (e.g., via an independent test script) test data can be incorporated. For example, if test data assigns the value of "life_insurance" to "claim_type," then the business rule will evaluate to true. If the business rule evaluates to true, then the field associated with the business rule should be visible on the screen of the software application. If, however, the test data assigns the value of "medical_bills" to "claim_type," then the business rule will evaluate to false. If the business rule evaluates to false, then the field associated with the business rule should not be visible on the screen of the software application.

Evaluation of a business rule can indicate whether a software application should produce an error (e.g., an expected result) related to a specific field of a screen of the software application. For example, a business rule for indicating whether an error should be produced can be "loss_date>=policy_date+waiting_period." The business rule can be associated with a field named "Date of loss." When evaluating the business rule (e.g., via an independent test script) test data can be incorporated. For example, if test data assigns the value of "Feb. 15, 2007" to "loss_date," "Feb. 1, 2007" to "policy_date," and "14" to "waiting period," then the business rule will evaluate to true. If the business rule evaluates to true, then the software application should not produce an error related to the field when submitting the screen containing the field. If, however, the test data assigns the value of "Feb. 15, 2007" to "loss_date," "Feb. 1, 2007" to "policy_date," and "20" to "waiting period," then the business rule will evaluate to false. If the business rule evaluates to false, then the software application should produce an error related to the field when submitting the screen containing the field. At a time of submission of the screen, expected results based on the evaluation of business rules can be compared to actual results. For example, if evaluation of a business rule indicates that an error should not be produced (an expected result), and upon actual submission no error is produced (an actual results), then a determination can be made that the software application is operating correctly. Otherwise, a determination can be made that the software application is not operating correctly.

In addition to, or instead of, indicating whether a software application should produce an error, evaluation of a business rule can indicate whether a software application should produce a specific error (e.g., a specific error message). Expanding on the example described in the above paragraph, the business rule "loss_date>=policy_date+waiting_period" can be further associated with the expected error message "Date of loss is not on or after the policy period plus the waiting period." If, based on the test data, the business rule evaluates to false, then the expected error message can be compared to an actual error message resulting from submission of the screen using the test data. If the software application returns an error, and the expected error message matches the actual error message, then a determination can be made that the software application is operating correctly. Otherwise, a determination can be made that the software application is not operating correctly.

Table 1 below contains a number of example business rules. The business rules in Table 1 can be stored, for example, in a business rules repository such as a database or spreadsheet. In Table 1, the "field" column contains the field name associated with the business rules of the row. The "visible" column contains a business rule that can be evaluated to indicate whether the field should be visible on the screen ("NA" indicates that the field should always be visible, regardless of the test data). The "validation" column contains a business rule that can be evaluated to indicate whether the software application should produce an error ("NA" indicates that no error should be produced regardless of the test data). If an error is produced, the "error message" field contains the expected error message (the error message that is expected to be produced by the software application when the software application is operating correctly).

Software applications can produce different types of error messages. A software application can produce error messages that are not tailored to the input data. For example, the error message "Date of loss is not on or after the policy period plus the waiting period" from Table 1 above is not tailored to the input data because it does not incorporate the input test data. A software application can also produce error messages that are tailored to the input test data. For example, the error message "Date of loss of Feb. 1, 2007, is not on or after the policy period of Jan. 15, 2007, plus the waiting period of 30 days" is tailored to the input data because it incorporates values from the input test data.

If a software application produces tailored error messages, then error messages will change with changing test data. Having to change error messages in business rules each time different test data is used can be cumbersome and error-prone. In a specific implementation, business rules can contain generic error messages (e.g., error message templates), and tailored error messages can be stored in a separate location (e.g., a separate database or file) which is updated with tailored error messages depending on the test data being used. For example, the business rules can contain the generic error message "Date of loss is not on or after the policy period plus the waiting period." When specific test data is known, a separate file can associate the generic error message with the tailored error message expected for the test data being used. For example, the separate file can associate the generic error message "Date of loss is not on or after the policy period plus the waiting period" with the tailored error message "Date of loss of Feb. 1, 2007, is not on or after the policy period of Jan. 15, 2007, plus the waiting period of 30 days." When the business rule is evaluated, the expected error message can be determined by looking up the generic error message (from the business rules) in the separate file to obtain the tailored error message. The tailored error message can then be used as the expected error message.

Example 8

Exemplary Business Rules Repository

In any of the examples herein, business rules can be stored in a business rules repository. A business rules repository can be a database, a spreadsheet, a file, or the like. A single business rules repository can be associated with a single screen of a software application (e.g., there can be a one-to-one correspondence between business rules repositories and screens of the software application). For example, each field of the screen can have one or more associated business rules stored in a business rules repository associated with the screen.

TABLE 1

Business Rules Table

| Field | Visible | Validation | Error Message |
| --- | --- | --- | --- |
| Date of loss | claim type = life_insurance | loss_date >= policy_date + waiting_period | Date of loss is not on or after the policy period plus the waiting period |
| Notification received | claim type = life_insurance | notification >= loss_date and notification <= today | Notification date must be on/after date of loss and on/before today |
| Medical bills | claim type = medical_bills | medical_bills >= 0 | Medical bills amount must be greater than or equal to zero |
| Cause of loss | NA (always visible) | loss_cause <> "none" | Mandatory field |
| Country of loss | NA (always visible) | loss_country <> "none" | Mandatory field |
| Adjustment | NA (always visible) | NA | |

Example 9

Exemplary Screen

In any of the examples herein, a screen can represent a specific testing location within a software application. For example, a screen can represent a specific page, window, web page, display, aspect, or component of a software application to be tested.

An example of a screen can be "new life insurance claim." The "new life insurance claim" screen can refer to a specific screen of a software application (e.g., a software application for processing insurance claims). The specific new life insurance claim screen can contain a number of user interface elements (e.g., fields for inputting data such as text entry fields, lists, drop-down fields, buttons, checkboxes, and the like, and other user interface elements such as buttons, links, static information, and the like). For example the specific new life insurance claim screen can contain claimant information, policy number information, a date of loss text field, a notification received date field, a cause of loss drop-down field, a country of loss drop-down field, an adjustment numerical field, and a submit button.

A user interface element can be used to navigate to a screen. For example, a button or link can be used to navigate to a "new life insurance claim" screen of an insurance claims processing application.

Example 10

Exemplary Test Data

In any of the examples herein, test data can be data for use by independent test scripts. Test data can be stored in various locations, such as a test data source. For example, test data can be stored in a database or file (e.g., in a spreadsheet). Test data can comprise various types of data. For example, test data can include values (e.g., numbers, letters, strings, text, dates, flags, etc.).

For example, test data for use by a "new life insurance claim" screen can comprise a specific date of loss (e.g., Jan. 1, 2007), a specific notification received date (e.g., Feb. 1, 2007), a specific cause of loss (e.g., accident), a specific country of loss (e.g., United States), and a specific adjustment (e.g., $500).

Table 2 below contains example test data. The test data depicted in Table 2 can be stored, for example, in a test data source such as a database, spreadsheet, or file. The first column of Table 2 lists the name of the test data (e.g., a variable name, field name, object name, or the like). The second column of Table 2 lists the value of the test data.

TABLE 2

Test Data

| Name | Value |
|---|---|
| claim_type | life_insurance |
| policy_number | 12345 |
| loss_date | Feb. 1, 2007 |
| notification_received | Feb. 15, 2007 |
| loss_cause | Accident |

Example 11

Exemplary Test Data Source

In any of the examples herein, a test data source can be a source of information for use by a software testing framework (e.g., for use by independent test scripts of the software testing framework). For example, a test data source can be a database, spreadsheet, data file, or the like. A test data source can store various types of test data (e.g., numbers, letters, strings, text, dates, flags, etc.).

A test data source can be associated with a specific independent test script or a specific end-to-end scenario. For example, a specific test data source (e.g., a specific spreadsheet) can be associated with a specific independent test script (e.g., contain test data for use by the specific independent test script). A specific test data source (e.g., a specific spreadsheet) can also be associated with, and contain test data for use by, a specific end-to-end scenario (e.g., the specific test data source can contain test data for use by multiple independent test scripts of the end-to-end scenario).

Example 12

Exemplary Benefits

The examples and technologies described herein can provide numerous benefits in the area of software testing.

Implementing the examples and technologies described herein can improve the maintainability of the software testing framework. For example, a software application can be divided into modules and a limited number of independent test scripts written to test the limited number of independent scenarios of each module. The independent test scripts can be executed independently or combined into end-to-end scenarios. If an independent scenario needs to be modified, then a user only has to modify the one independent test script associated with that independent scenario. The modification will then carry over to any end-to-end scenario that uses the independent test script.

Maintainability of the software testing framework is also improved by separately storing business rules and by not duplicating business rules. For example, each screen can be associated with its own business rules repository. If a field of the screen changes, or if operation of the software application changes for the screen, then the business rules for the screen can be updated. Any independent test scripts or end-to-end scenarios that test the screen will then use the updated business rules.

Maintainability of the software testing framework is also improved due to the loosely-coupled nature of the components. For example, independent test scripts can easily be combined to test various end-to-end scenarios. Modules can be used to group related business process steps such that an independent scenario can be selected from each module and combined into an end-to-end scenario.

Using independent test scripts, navigation can be controlled by the user. For example, the end user can select and combine independent test scripts to test end-to-end scenarios. In addition, using test data, the user can control which business rules are tested. For example, by changing test data, the user can test different business rules.

The time and effort needed to develop the testing components can be reduced. For example, instead of writing numerous test cases (e.g., different test cases for each function and additional test cases for various combinations of functions, fields, and/or screens), a limited number of independent test scripts can be created. The independent test scripts can be executed independently (e.g., to test one or more screens), or the independent test scripts can be easily combined (e.g., into an end-to-end scenario) without having to create any additional scripts or business rules. In addition, business rules only have to be written once for each screen of the software application.

Example 13

Exemplary Software Testing Framework

FIG. 1 shows an exemplary software testing framework 100 for testing software applications. The example framework comprises independent test scripts 110, business rules 120, and test data 130.

The independent test scripts 110 can correspond to independent scenarios of a software application. The independent test scripts 110 can be used to test the software application by directing testing of screens of the software application. For example, the independent test scripts 110 can populate fields on screens of the software application with test data 130. The independent test scripts 110 can evaluate business rules 120 corresponding to fields on the screens. The independent test scripts 110 can determine expected results of submission of the screens based on the business rules 120 and the test data 130 (e.g., by applying the test data 130 to business rules 120 of a screen). The independent test scripts 110 can determine actual results by submitting screens. The independent test scripts 110 can compare expected and actual results. The independent test scripts 110 can produce results of the comparison (e.g., output an indication of whether the software application is operating correctly).

The business rules 120 can be stored in business rules repositories. Business rules 120 can be grouped according to screen. For example, the business rules for a screen of a software application can be grouped together in a single repository (e.g., a single spreadsheet).

The test data 130 can be stored in test data sources. Test data 130 can be grouped according to independent test scripts 110. For example, a specific independent test script can be associated with a specific test data stored in a specific test data source (e.g., a specific test data spreadsheet). The test data 130 can be used to determine which business rules 120 to evaluate for a specific screen. For example, some business rules will only be evaluated if a specific condition, defined in terms of test data, is met (e.g., a business rule for determining whether a field on a screen should be visible).

The independent test scripts 110, business rules 120, and test data 130 can be stored separately. For example, the independent test scripts 110 can be stored in one or more script files. The business rules 120 can be stored in one or more business rules repositories (e.g., one or more databases, spreadsheets, files, etc.). The test data 130 can be stored in one or more test data sources (e.g., one or more databases, spreadsheets, files, etc.).

Storing the business rules separately can allow a user to respond to changes in a software application (e.g., changes to fields on screens of the software application) by updating business rules in only one location. For example, if a new field is added to a screen of the software application, the user can edit the business rules repository (e.g., the spreadsheet containing business rules) for the screen. If a business process needs to be changed (e.g., if a waiting period date is extended), then the user can edit the business rules related to the waiting period date (e.g., edit business rules related to fields that depend on the waiting period date). Once business rules have been updated, then any independent test script or end-to-end scenario that uses those business rules will evaluate the updated business rules.

Similarly, storing test data and test scripts separately can allow a user to respond to changes in a software application. For example, in order for a user to change which fields on a screen to test, the user can just change the test data.

Example 14

Exemplary Method for Testing Software Applications

Figure 2:
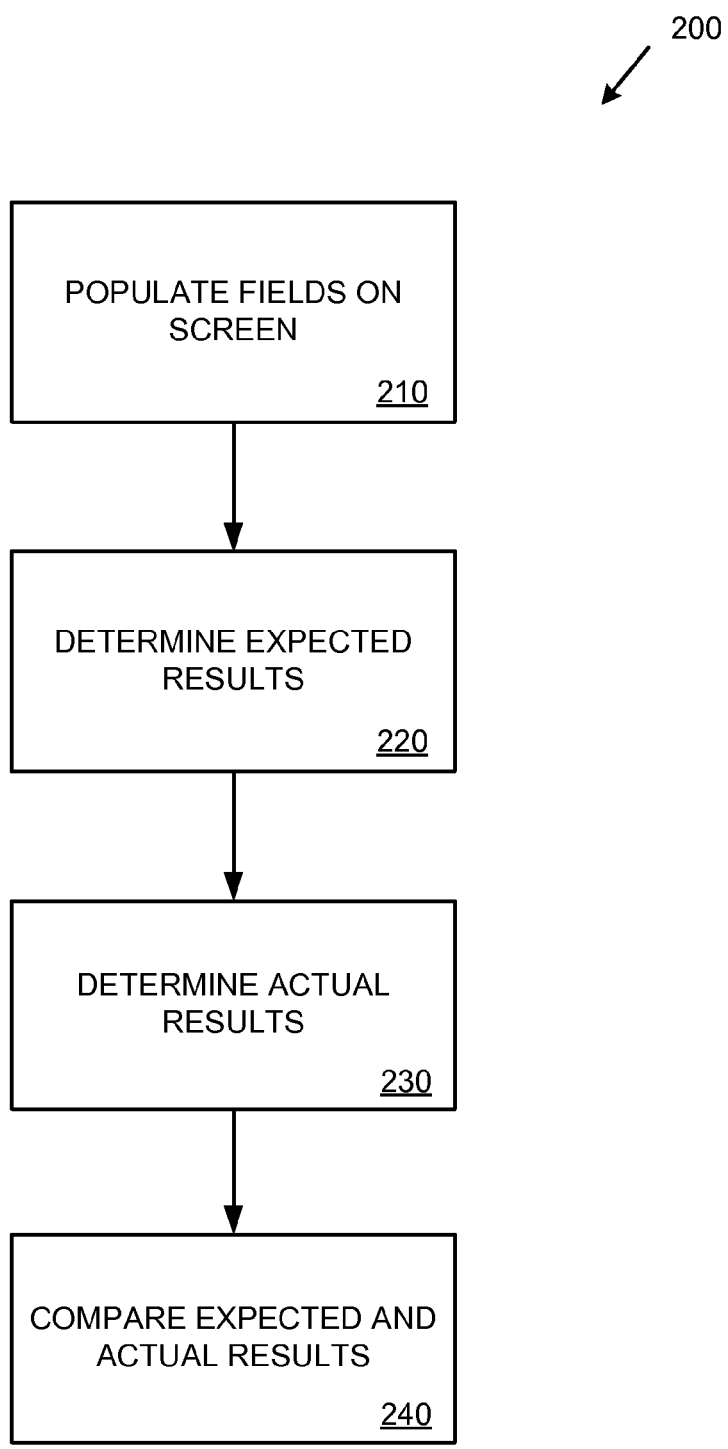
FIG. 2 is a flowchart showing an exemplary method for testing software applications.

FIG. 2 shows an exemplary method 200 for testing software applications (e.g., for testing independent scenarios of software applications), and can be performed, for example, using a framework such as that shown in FIG. 1. At 210, fields on a screen of a software application are populated with test data. For example, the fields can be populated with test data from a test data source.

At 220, expected results are determined based on evaluation of business rules (e.g., results that are expected if the screen is actually submitted with the populated test data). Expected results can comprise an indication of whether a field of the screen should be visible and an indication of whether an error should be produced. Test data can be used to determine expected results. For example, a business rule can be evaluated with test data to determine whether a field on the screen should be visible. A business rule can be evaluated with test data to determine whether an error should be produced for a specific field and to determine the specific error message.

At 230, the screen is submitted and actual results are determined. Actual results can comprise errors produced by the software application upon submission of the screen. Actual results can also comprise an indication that there were no errors upon submission. For example, a screen can comprise four fields. Upon submission of the screen, the software application can indicate that there are errors related to two of the four fields, and the software application can also indicate specific error messages (e.g., two specific error messages, one for each of the two fields that had errors).

At 240, the expected results 220 are compared with the actual results 230. If the expected results 220 match the actual results 230, then a determination can be made that the software application is operating correctly. If the expected results 220 do not match the actual results 230, then a determination can be made that the software application is not operating correctly. Results of the comparison 240 can include: an indication of fields of the software application that are operating correctly, an indication of fields of the software application that are operating incorrectly, error messages expected to be produced, and error messages actually produced.

The comparison 240 can produce one of four types of results. First, if the expected results indicate that no error should be produced for the particular field, and the actual result of submission is that no error is produced, then the result can indicate that the software application is operating correctly with respect to the particular field. In this case, testing of the software application can proceed (e.g., proceed to the next screen or next independent test script of an end-to-end scenario).

Second, if the expected results indicate that no error should be produced for the particular field, and the actual result of submission is that an error is produced, then the result can indicate that the software application is operating incorrectly with respect to the particular field. In this case, testing of the software application can stop.

Third, if the expected results indicate that a specific error should be produced for the particular field, and the actual result of submission is that the specific error is produced, then the result can indicate that the software application is operating correctly with respect to the particular field. In this case, testing of the software application can stop. Even though the software application is operating correctly, the fact that the software application produced the error can preclude further testing.

Fourth, if the expected results indicate that a specific error should be produced for the particular field, and the actual result of submission is that a different error is produced, then the result can indicate that the software application is operating incorrectly with respect to the particular field. In this case, testing of the software application can stop.

The example method 200 can also output results of the comparison 240. For example, results can be saved (e.g., in a database, file, or spreadsheet). Results can also be displayed (e.g., on a computer display).

Example 15

Exemplary Method for Populating Fields

Figure 3:
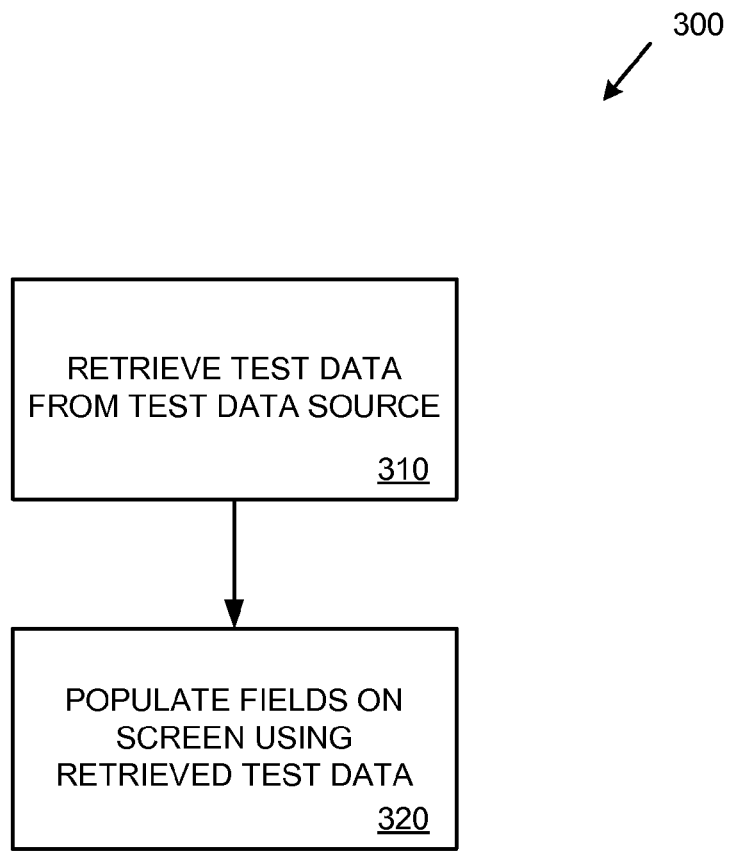
FIG. 3 is a flowchart showing an exemplary method for populating fields on a screen.

FIG. 3 shows an exemplary method 300 for populating fields on a screen. At 310, test data for the screen is retrieved from a test data source. For example, the test data can be retrieved from a spreadsheet associated with the screen or with the independent test script performing the population.

At 320, fields on the screen are populated using the retrieved test data. For example, if the screen contains a "date of loss" field, then a value for the field can be retrieved and used to populate the field (e.g., the "date of loss" field can be populated with the test data value "Feb. 1, 2007").

Fields on the screen can be populated with test data even if the fields already contain information. For example, if a screen contains an "adjustment" field, the "adjustment" field may already contain an existing value (e.g., "$0.00"). The "$0.00" value can be a default value. The existing value can be replaced (e.g., overwritten) when the field on the field is populated 320 with the retrieved test data (e.g., an existing value of "$0.00" can be replaced with a value of "$500.00" from the retrieved test data).

Existing values can be conditionally replaced. For example, existing values can only be replaced if they are different from the retrieved test value. For example, if a field contains an existing value of "$0.00," and the retrieved test data includes a value of "$0.00" for the field, then the value of the field would not be changed because the existing value and the retrieved test data value are the same. If, however, the retrieved test data includes a value of "$500.00" for the field, then the value of the field would be changed to "$500.00" because the existing value and the retrieved test value are different. Replacing existing values only if different from test data values can be called smart parameterization.

Using smart parameterization can result in more accurate testing. For example, some software applications can behave differently if an existing value is replaced, even if the replaced value is the same as the existing value. Using smart parameterization can more accurately reflect the way a human user would interact with the software application (e.g., a human user may only change existing values if the user intends to enter a different value).

Example 16

Exemplary Method for Testing an Independent Scenario

Figure 4:
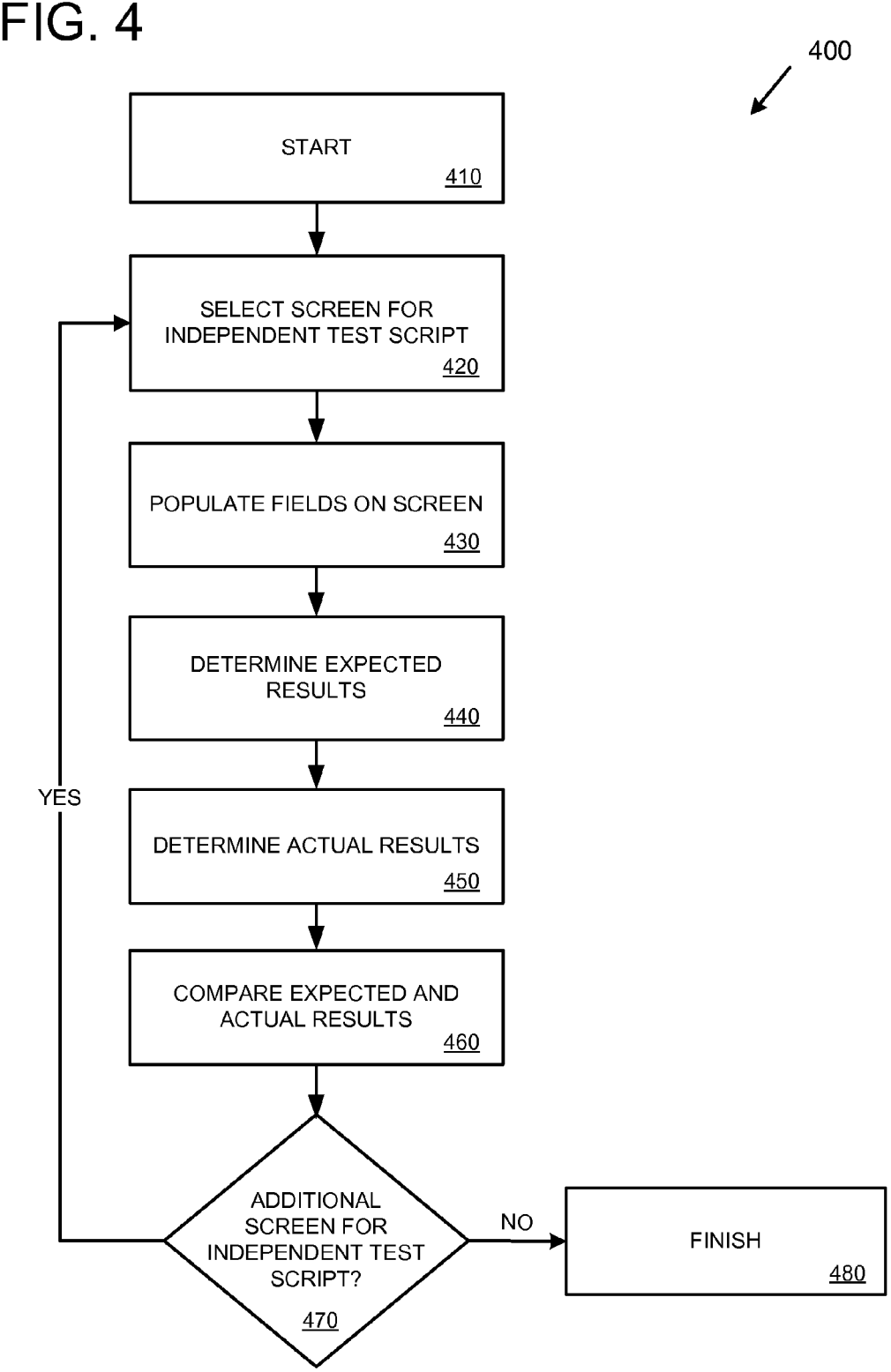
FIG. 4 is a flowchart showing an exemplary method for testing an independent scenario.

FIG. 4 shows an exemplary method 400 testing an independent scenario. At 410, the method starts. For example, the method can be started manually (e.g., by a user testing the independent scenario), or as part of an end-to-end scenario.

At 420, a screen is selected. If the method has just started, the first screen of the independent test script is selected. At 430, fields on the selected screen are populated with test data. At 440, expected results are determined based on the evaluation of business rules. At 450, actual results are determined from submission of the screen. At 460, the expected results 440 are compared to the actual results 450.

At 470, the method checks whether there are additional screens that need to be tested for the independent scenario. If there are, then the method proceeds to 420 and the next screen of the independent scenario is selected. If there are no more screens, the method finishes 480.

Example 17

Exemplary Method for Testing an End-to-End Scenario

Figure 5:
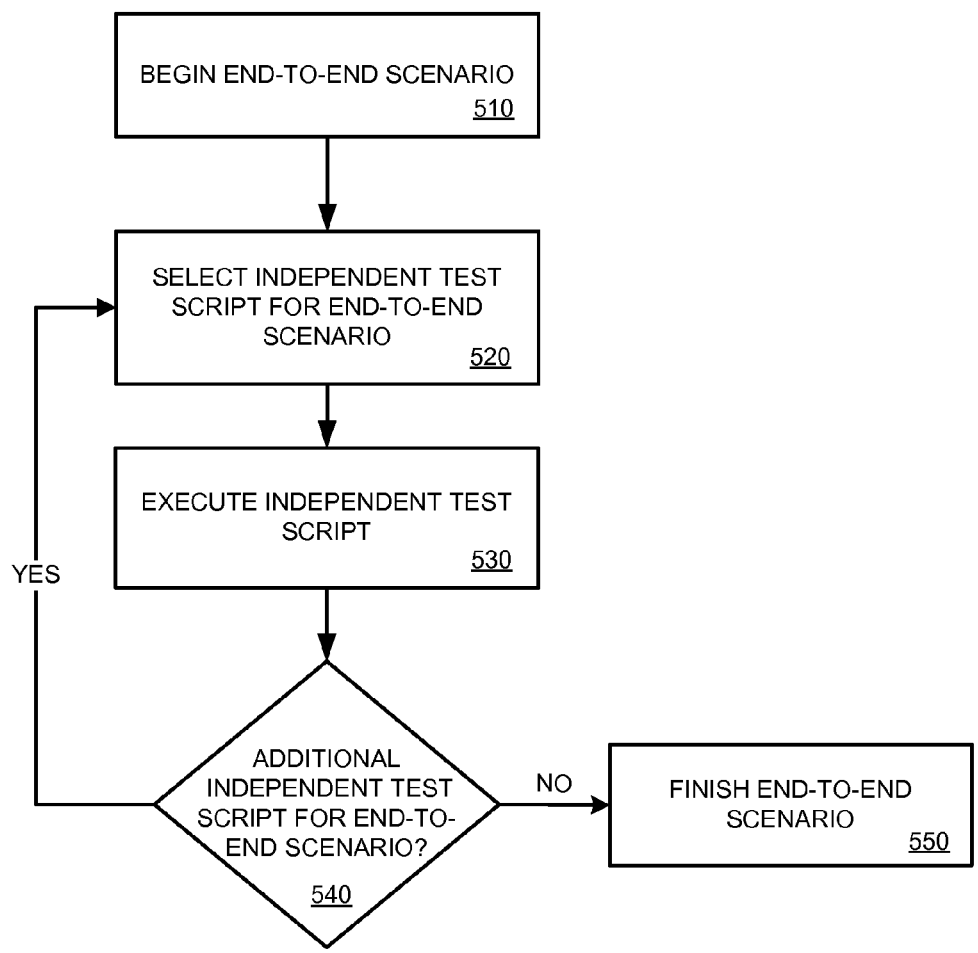
FIG. 5 is a flowchart showing an exemplary method for testing an end-to-end scenario.

FIG. 5 shows an exemplary method 500 testing an end-to-end scenario. At 510, the method to test the end-to-end scenario begins. For example, the method can be started by a user.

At 520, an independent test script of the end-to-end scenario is selected. If the method has just started, the first independent test script of the end-to-end scenario is selected.

At 530, the selected independent test script is executed. Executing the independent test script can comprise navigating to one or more screens, populating fields on the screens with test data, evaluating business rules associated with the screens to determine expected results, submitting the screens to determine actual results, comparing the expected and actual results, and outputting results of the comparison.

At 540, the method checks whether there are additional independent test scripts that need to be tested for the end-to-end scenario. If there are, then the method proceeds to 520 and the next independent test script of the end-to-end scenario is selected. If there are no more independent test scripts, the method finishes 550.

Example 18

Exemplary Modules of a Software Application

Figure 6:
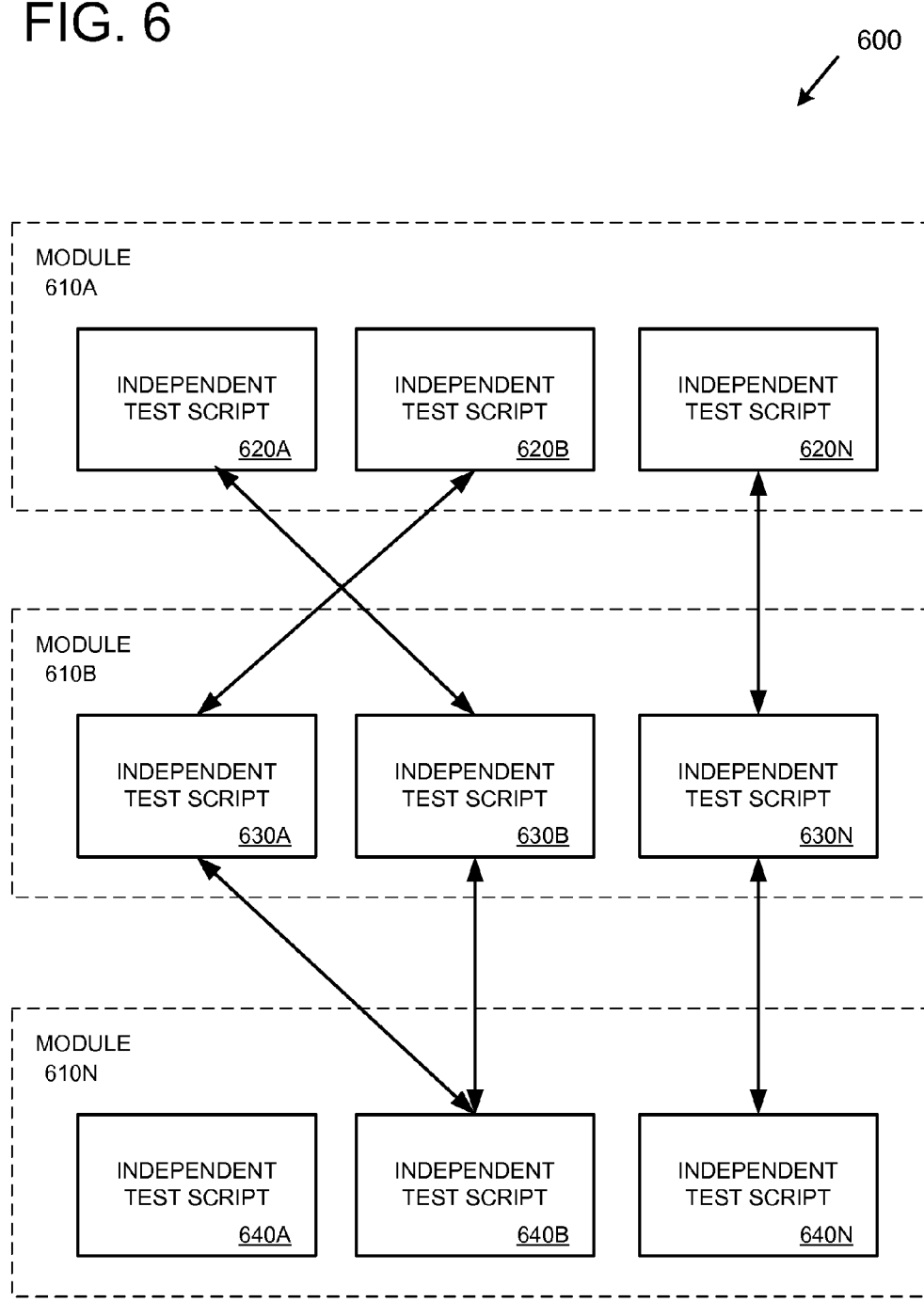
FIG. 6 is a diagram showing exemplary modules.

FIG. 6 shows exemplary modules 600 of a software application. The modules can represent groups of related steps in business processes of the software application.

The example 600 depicts three modules (610A-N), however a software application can have one or more modules (e.g., an arbitrary number of modules). Each module comprises one or more independent test scripts (e.g., independent test scripts 620A-N of module 610A).

For example, module 610A can be a new insurance claim module of an insurance claims processing software application. Module 610A can include the following independent test scripts for testing different types of new insurance claims: new life insurance claim independent test script 620A, new medical bills claim independent test script 620B, and new disability claim independent test script 620N. Module 610B can be a claim assessment module (e.g., including approved 630A, conditional approved 630B, and declined 630N independent test scripts). Module 610N can be a claims payment module (e.g., including conditional payment 640A, payment 640B, and no payment 640N independent test scripts).

An end-to-end scenario can be created by selecting one independent test script from each of the modules and placing them into a sequence. For example, an end-to-end scenario can include independent test script 620A, followed by independent test script 630B, followed by independent test script 640B (e.g., new life insurance claim, conditional approved, payment). A different end-to-end scenario can include independent test script 620B, followed by independent test script 630A, followed by independent test script 640B (e.g., new medical bills claim, approved, payment).

An end-to-end scenario comprising multiple independent test scripts can be created. Testing of the end-to-end scenario can be automated (e.g., the independent test scripts of the end-to-end scenario can be executed without user intervention). For example, control can automatically pass from one independent test script to the next independent test script of the end-to-end scenario.

An independent test script (e.g., 620A) can be executed outside of an end-to-end scenario. For example, a user can test one or more of the independent test scripts separately from each other (e.g., not combined into an end-to-end scenario).

Example 19

Exemplary End-to-End Scenario Components

Figure 7:
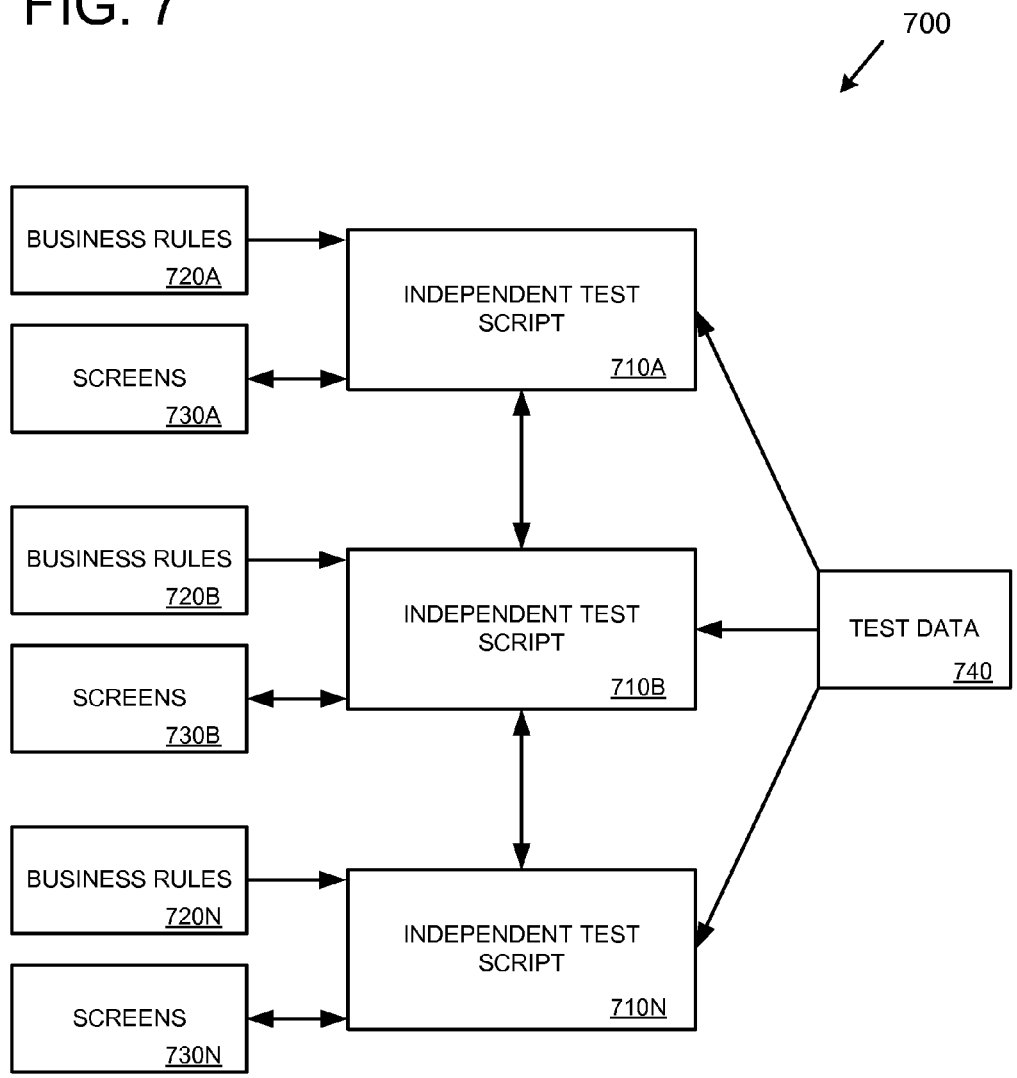
FIG. 7 is a diagram showing exemplary components of an end-to-end scenario.

FIG. 7 shows exemplary components of an end-to-end scenario 700. The example end-to-end scenario comprises three independent test scripts 710A-N corresponding to three independent scenarios of a software application. Each of the three independent test scripts 710A-N can be selected from a different module of the software application (e.g., the three independent test scripts 710A-N can correspond to independent test scripts 620A, 630B, and 640B depicted in FIG. 6).

Each of the independent test scripts 710A-N is used to test one or more screens of the software application. For example, independent test script 710A is used to test screens 730A.

Each of the independent test scripts 710A-N retrieves test data 740. For example, the test data 740 can be a single test data source (e.g., a single spreadsheet or database). The test data 740 can also be multiple test data sources (e.g., a separate spreadsheet or database for use by each independent test script 710A-N). The independent test scripts 710A-N use the test data 740 to populate fields on the screens 730A-N and when evaluating business rules 720A-N.

In the example 700, each independent test script 710A-N is associated with a separate set of business rules 720A-N. The business rules of a specific independent test script are associated with the screens of the specific independent test script. For example, business rules 720A are associated with screens 730A. For example, the association can be at screen-level (e.g., each screen can be associated with its own business rules).

The end-to-end scenario can be tested by executing the independent test scripts 710A-N in sequence. Control can be passed from one independent test script to the next (e.g., from independent test script 710A to independent test script 710B and finally to independent test script 710N).

For example, the execution of independent test script 710A can comprise selecting a first screen from the screens 730A, retrieving test data 740 for fields and business rules 720A of the first screen, populating fields of the first screen with the retrieved test data, evaluating business rules of the first screen to determine expected results, submitting the first screen to determine actual results, comparing the expected and actual results, and outputting a result of the comparison. The independent test script 710A can repeat this process for any additional screens 730A. Once the independent test script 710A has completed testing all screens 730A, the independent test script 710A can pass control to independent test script 710B, which can then test its screens 730B, and so on.

Example 20

Exemplary Method for Testing an Independent Scenario

Figure 8:
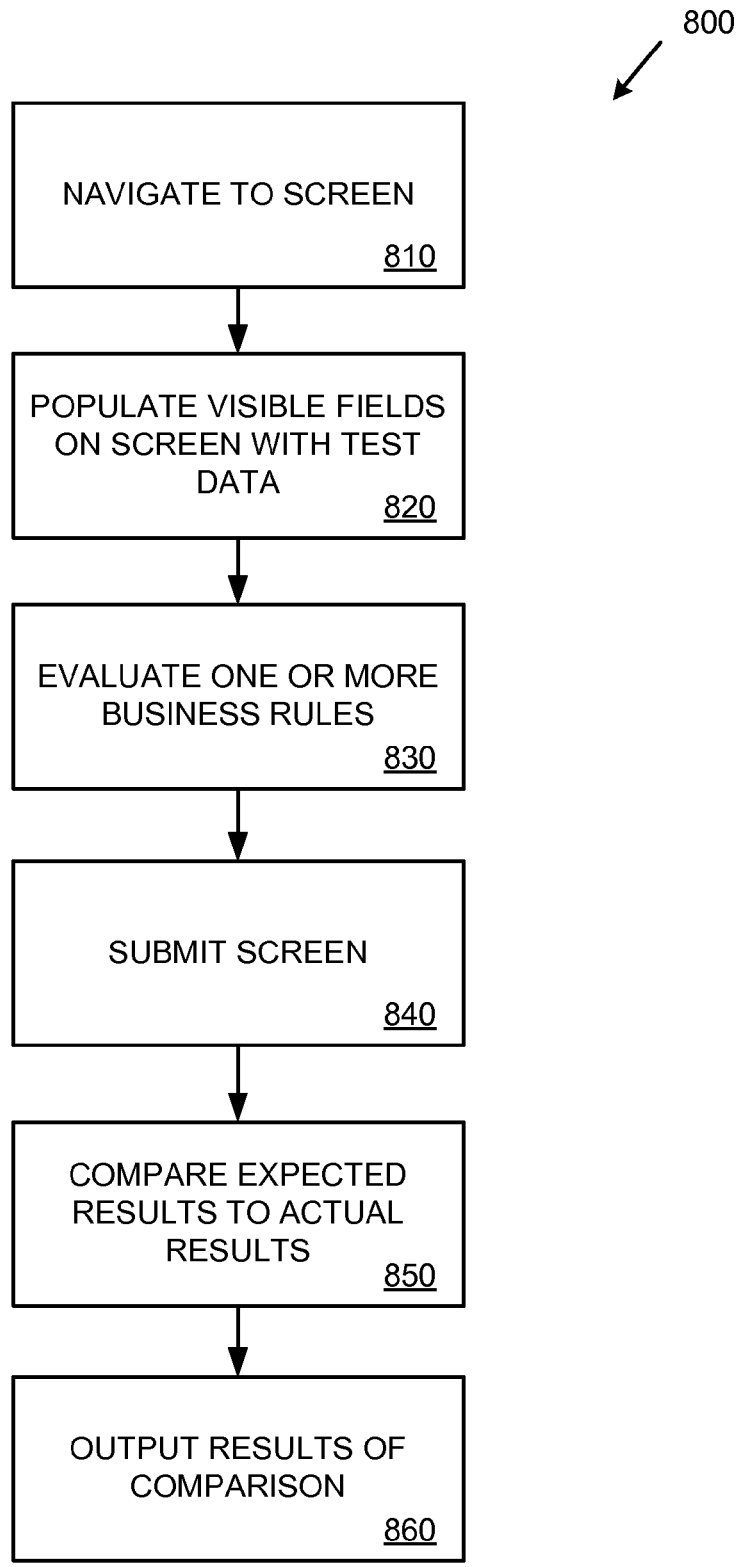
FIG. 8 is a flowchart showing an exemplary method for testing an independent scenario.

FIG. 8 shows an exemplary method 800 for testing independent scenarios of software applications, and can be performed, for example, using a framework such as that shown in FIG. 1. For example, the method 800 can be implemented using an independent test script.

At 810, navigation is performed to reach a screen of the software application. For example, one or more user interface elements can be selected in order to navigate to the screen (e.g., one or more buttons, links, menu options, etc.).

At 820, visible fields on the screen are populated with test data. For example, the screen may be capable of displaying a number of fields. Dependent on the state of the software application (e.g., test data entered on previous screens, setup configuration, user interface elements selected during navigation, etc.), fewer than all of the fields can be displayed. For example, the screen can be a new claim screen supporting different types of new claims (e.g., new life insurance claims, new medical bills claims, and new disability claims). Depending on test data used during setup of the independent test script, the new life insurance claim type can be designated. In such a case, the screen will display fields related to new life insurance claims and not display fields that are exclusive to the other claim types (new medical bills claims and new disability claims).

At 830, one or more business rules related to the screen are evaluated using the test data. A result of the evaluation can be an indication of which fields capable of being displayed on the screen should be displayed and an indication of which fields should produce errors when the screen is submitted (and optionally the error messages as well). These results can be called the expected results because, based on the evaluation of the business rules, these results are expected upon submission of the screen if the software application is operating correctly.

At 840, the screen is submitted. For example, the screen can be submitted by selecting a user interface element (e.g., a submit button or link). Upon submission of the screen, the software application will produce actual results of the submission. For example, the actual results can comprise an indication that one or more fields displayed by the screen contain errors. The actual results can comprise one or more error messages. The actual results can also indicate that there were no errors upon submission.

At 850, the expected results determined from the evaluation of the business rules 830 are compared to the actual results from submission of the screen 840. For example, the comparison can match fields expected to be visible on the screen and fields actually visible on the screen. The comparison can match errors expected for each visible field to actual results upon submission of each field. The comparison can also match error messages expected for each visible field and actual error messages upon submission of each field.

At 860, a result of the comparison can be output. For example, the result of the comparison can comprise an indication of whether the software application is operating correctly (e.g., if the expected results match the actual results) or incorrectly (e.g., if the expected results do not match the actual results).

Example 21

Exemplary Screens

FIG. 9 shows an exemplary software application screen 900 for creating a new life insurance claim. The screen displays information relating to a claimant and a policy number 910. The screen also displays a number of fields 910. The fields displayed by the screen include a date of loss field, a notification received field, a cause of loss field, a country of loss field, and an adjustment field 910. The screen also displays a submit button 910.

The screen 900 can be tested using an independent test script. For example, the independent test script can populate fields on the screen 910 with test data (e.g., populate the date of loss field with the data "Feb. 1, 2007"). The independent test script can evaluate business rules associated with the screen 900. For example, one of the business rules can be evaluated to indicate whether fields capable of being displayed by the screen should be displayed (e.g., the business rule can indicate that the date of loss field should be displayed if the claim type is life insurance). The independent test script can submit the screen 900 by selecting the "submit" button 910. Submission of the screen can produce actual results, which can be compared to the expected results.

After submission of the screen 900, control can pass to another screen of the software application (e.g., as part of an end-to-end scenario). For example, control can pass to the screen depicted in FIG. 10.

FIG. 10 shows an exemplary software application screen 1000 for assessing a life insurance claim. For example, the screen 1000 can be displayed after submission of the screen depicted in FIG. 9. The screen displays information relating to a claimant and a policy number 1010. The screen also displays a number of fields 1010. The fields displayed by the screen include a drop-down status field 1010 used to assess the claim (authorize payment, defer payment, or decline payment). A reason can be selected from the reason drop-down field 1010. The screen also displays a submit button 1010. After submission of the screen 1000, control can pass to another screen of the software application (e.g., as part of an end-to-end scenario).

FIG. 11 shows an exemplary software application screen 1100 for payment of a life insurance claim. For example, the screen 1100 can be displayed after submission of the screen depicted in FIG. 10. The screen displays information relating to a claimant and a policy number 1110. The screen also displays a number of fields 1110. The fields displayed by the screen include a liability amount field, an interest amount field, an expenses amount field, and a total payment field 1110. The screen also displays a submit button 1110. After submission of the screen 1100, control can pass to another screen of the software application (e.g., as part of an end-to-end scenario), or if the screen is the last screen of an independent test script or an end-to-end scenario, then the testing process can stop.

Example 22

Exemplary Computing Environment

Figure 12:
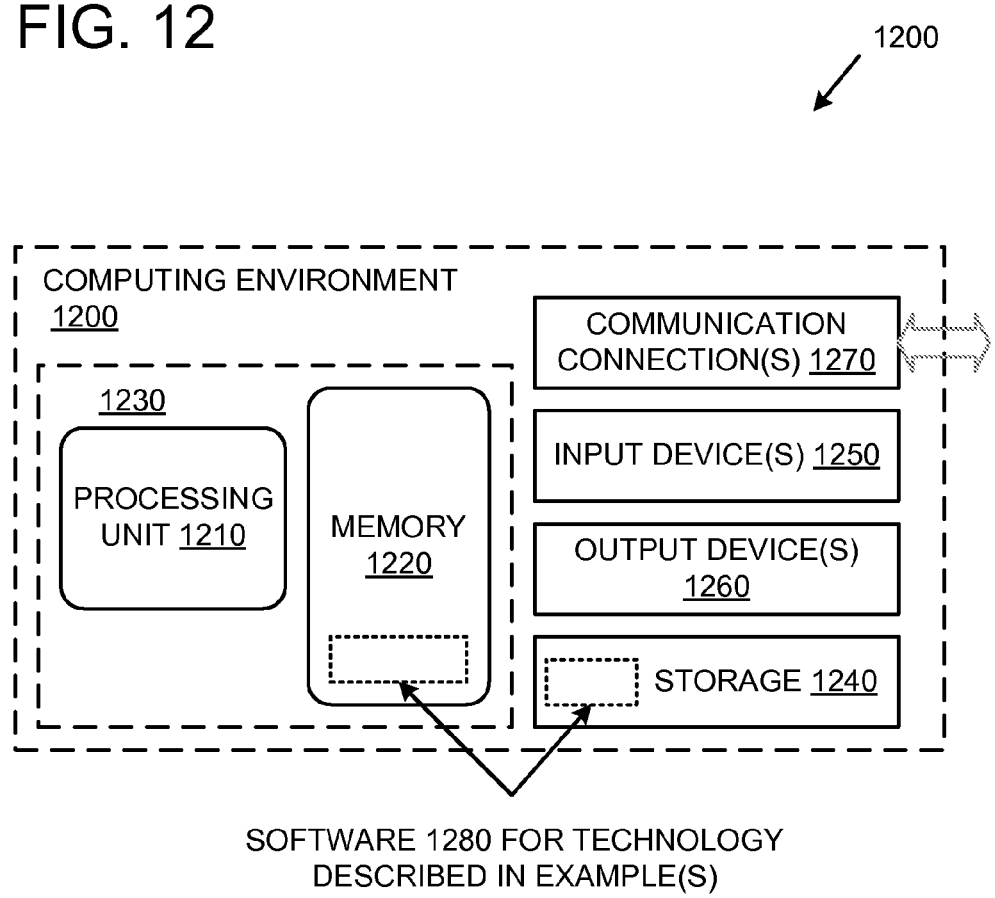
FIG. 12 is a block diagram illustrating an example of a computing environment that can be used to implement any of the technologies described herein.

FIG. 12 illustrates a generalized example of a suitable computing environment 1200 in which described embodiments, techniques, and technologies may be implemented. The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 12, the computing environment 1200 includes at least one central processing unit 1210 and memory 1220. In FIG. 12, this most basic configuration 1230 is included within a dashed line. The central processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280 that can, for example, implement the technologies described herein. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. The storage 1240 stores instructions for the software 1280, which can implement technologies described herein.

The input device(s) 1250 may be a touch input device, such as a keyboard, keypad, mouse, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1200. By way of example, and not limitation, with the computing environment 1200, computer-readable media include memory 1220, storage 1240, communication media (not shown), and combinations of any of the above.

Example 23

Exemplary Automated Methods

Any of the methods described herein can be performed via one or more computer-readable media (e.g., storage or other tangible media) having computer-executable instructions for performing (e.g., causing a computing device or computer to perform) such methods. Operation can be fully automatic, semi-automatic, or involve manual intervention.

Example 24

Exemplary Combinations

The technologies of any example described herein can be combined with the technologies of any one or more other examples described herein.

Example 25

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An automated software testing framework, implemented at least in part by a computing device, for testing independent scenarios of software applications, the framework comprising:
   one or more independent test scripts corresponding to one or more independent scenarios of a software application, wherein each of the one or more independent test scripts is used to test one or more screens of the software application, and wherein the testing of the one or more screens is automated, using the computing device and without user intervention, by the one or more independent test scripts;
   one or more business rules repositories, wherein each of the one or more business rules repositories contains business rules for a corresponding screen of the software application; and
   one or more test data sources storing test data for use by the one or more independent test scripts;
   wherein the one or more test data sources, the one or more business rules repositories, and the one or more independent test scripts are stored separately from each other; and
   wherein at least one of the business rules is a business rule for determining whether a field on a screen of the software application should be visible based on evaluation of the business rule using the test data.

2. The framework of claim 1 wherein the one or more independent test scripts retrieve test data from the one or more test data sources and populate fields on screens of the software application with the retrieved test data.

3. The framework of claim 1 wherein the one or more independent test scripts evaluate business rules from the one or more business rules repositories to determine expected results of submission of screens of the software application.

4. The framework of claim 1 wherein the one or more independent test scripts submit screens of the software application and determine actual results of the submission.

5. The framework of claim 1 wherein each of the one or more independent test scripts tests one or more screens of the software application by evaluating business rules from the one or more business rules repositories using test data from the one or more test data sources.

6. The framework of claim 1 wherein the one or more independent test scripts compare expected results, determined by evaluation of business rules from the one or more business rules repositories, to actual results, determined by submission of screens of the software application.

7. The framework of claim 1 wherein business rules from the one or more business rules repositories are selected for evaluation based on the test data stored in the one or more test data sources.

8. A computer implemented automated software testing framework for testing end-to-end scenarios of software applications, without using test cases, the framework comprising:
   a plurality of modules of a software application, wherein each module of the plurality of modules comprises one or more independent test scripts;
   a plurality of business rules repositories, wherein each of the plurality of business rules repositories stores business rules for a screen of the software application; and
   a plurality of test data sources used by independent test scripts to evaluate business rules from the plurality of business rules repositories and to populate fields of screens of the software application;
   wherein an end-to-end scenario of the software application is tested by executing, in a user-defined sequence, independent test scripts from at least two of the plurality of modules, and wherein the testing of the software application is automated, using the computer and without user intervention, by the independent test scripts; and
   wherein at least one of the business rules is a business rule for determining whether a field on a screen of the software application should be visible based on evaluation of the business rule using the test data.

9. The framework of claim 8 wherein each independent test script of each module of the plurality of modules tests one or more screens of the software application.

10. The framework of claim 8 wherein the end-to-end scenario comprises a first independent test script selected from a first module of the plurality of modules and a second different independent test script selected from a second different module of the plurality of modules.

11. A method, implemented at least in part by a computing device, for testing an independent scenario of a software application using an automated software testing framework, the method comprising:
   by the computing device and without user intervention:
      populating a plurality of fields on a screen of the software application with test data;
      determining expected results based on evaluation, using the test data, of a plurality of business rules associated with the screen;
      submitting the screen and determining actual results of the submission;
      comparing the expected results to the actual results;
      based on the comparison, outputting an indication of whether the software application is operating correctly;
      populating a plurality of fields on a second different screen of the software application with the test data;
      determining expected results based on evaluation, using the test data, of a plurality of different business rules;
      submitting the second screen and determining actual results of the submission of the second screen;
      comparing the expected results from the evaluation of the plurality of different business rules to the actual results of the submission of the second screen; and
      based on the comparison of the expected results from the evaluation of the plurality of different business rules to the actual results of the submission of the second screen, outputting another indication of whether the software application is operating correctly.

12. The method of claim 11 wherein the plurality of fields on the screen are populated, using smart parameterization, with test data retrieved from a test data source.

13. The method of claim 11 wherein at least one of the plurality of business rules is a business rule for determining whether a field of the plurality of fields on the screen should be visible based on evaluation of the business rule using the test data.

14. The method of claim 11 wherein at least one of the plurality of business rules is a business rule for determining, based on evaluation of the business rule using the test data, whether a field of the plurality of fields on the screen is expected to produce an error when the screen is submitted.

15. The method of claim 14 wherein the business rule for determining whether the field of the plurality of fields on the screen is expected to produce an error indicates an expected error message.

16. The method of claim 11 wherein the plurality of business rules are used to test the plurality of fields on the screen based on a single submission of the screen.

17. The method of claim 11 wherein the expected results comprise an indication of which fields of the plurality of fields on the screen should be visible on the screen.

18. The method of claim 11 further comprising:
before populating the plurality of fields on the screen, navigating to the screen.

19. One or more computer-readable storage media, not consisting of a signal, storing computer-executable instructions for causing a computing device to perform the method of claim 11.

20. A computer implemented method for testing an end-to-end scenario of a software application using an automated software testing framework, without using test cases, the method comprising:
for each of a plurality of independent scenarios of the end-to-end scenario of the software application:
executing, by the computer and without user intervention, an independent test script associated with the independent scenario, wherein the executing comprises navigating to one or more screens of the software application, retrieving test data associated with fields on the one or more screens, populating the fields on the one or more screens with the retrieved test data, evaluating business rules to determine expected results, submitting the one or more screens to determine actual results, comparing the expected and the actual results, and, based on the comparison, outputting one or more indications of whether the software application is operating correctly;
wherein at least one of the business rules is a business rule for determining whether a field on a screen of the software application should be visible based on evaluation of the business rule using the test data.

21. The method of claim 20 wherein the business rules are stored in one or more repositories, separately from test data and independent test scripts.

22. The method of claim 20 wherein each of the plurality of independent scenarios are selected from a different module of the software application.

23. A computer implemented method for testing an independent scenario of a software application using an automated software testing framework, without using test cases, the method comprising:
populating, using an independent test script associated with the independent scenario, a plurality of fields on a screen of the software application with test data retrieved by the independent test script from a test data source;
determining, via the independent test script, expected results of submission of the screen based on evaluation of a plurality of business rules stored in a business rules repository;
submitting, via the independent test script, the screen and determining, via the independent test script, actual results of the submission;
comparing, via the independent test script, the expected results to the actual results; and
based on the comparison, outputting, via the independent test script, an indication of whether the software application is operating correctly;
wherein the testing of the independent scenario is automated, using the computer and without user intervention, by the independent test script; and
wherein at least one of the plurality of business rules is a business rule for determining whether a field on the screen of the software application should be visible based on evaluation of the business rule using the test data.

* * * * *